United States Patent [19]

Hultholm et al.

[11] Patent Number: 4,548,765
[45] Date of Patent: Oct. 22, 1985

[54] METHOD FOR DISPERSING GAS IN A SOLID-CONTAINING LIQUID, AND AN APPARATUS FOR IT

[75] Inventors: Stig-Erik Hultholm; Launo L. Lilja; Valto J. Mäkitalo, all of Pori; Bror G. Nyman, Vanha-Ulvila, all of Finland

[73] Assignee: Outokumpu Oy, Outokumpu, Finland

[21] Appl. No.: 523,725

[22] Filed: Aug. 16, 1983

[30] Foreign Application Priority Data

Aug. 24, 1982 [FI] Finland ................................. 822936

[51] Int. Cl.$^4$ ................................. B01F 3/04
[52] U.S. Cl. ................................. 261/93; 209/169; 209/170; 210/219; 210/221.2; 210/758; 366/102; 366/327; 416/175; 422/225; 422/231
[58] Field of Search ................................. 261/93, 87, 91; 209/169, 170; 422/227, 228, 231, 225; 366/102-104, 327; 435/313-315; 210/219, 221.2, 758; 415/143; 416/175 R, 175 A

[56] References Cited

U.S. PATENT DOCUMENTS

| | | | |
|---|---|---|---|
| 871,729 | 11/1907 | McChord, Jr. | 416/175 R |
| 1,796,278 | 3/1931 | Bakewell | 261/87 |
| 2,853,280 | 9/1958 | Cusi | 261/93 X |
| 2,944,802 | 7/1960 | Daman | 261/87 |
| 2,964,301 | 12/1960 | Bosse | 416/175 X |
| 3,154,601 | 10/1964 | Kalinske et al. | 366/102 X |
| 3,222,141 | 12/1965 | Donaldson | 422/228 |
| 3,236,744 | 2/1966 | Yamaha | 435/315 X |
| 3,341,450 | 9/1967 | Ciabattari et al. | 261/91 X |
| 4,238,159 | 12/1980 | Tielens et al. | 366/327 |

FOREIGN PATENT DOCUMENTS 259725 4/1970 U.S.S.R. ................................. 261/91

*Primary Examiner*—Richard L. Chiesa
*Attorney, Agent, or Firm*—Bucknam and Archer

[57] ABSTRACT

A method for directing a desired amount of gas below the liquid surface in a solution reactor, to mix the bubbles as effectively as possible with a suspension of a pulverous solid and a liquid, and to produce in the mixed gas-liquid-solid suspension a strong, suspension-maintaining flow field which is downward in the center of the reactor and upward along its sides, is disclosed. A so-called gls-mixer according to the invention consists of a circular plate fitted at the lower end of a rotating shaft suspended by its upper end, vertical dispersion blades situated radially at the edges of the circular plate, and baffles attached to the dispersion blades by means of arms. An upwardly directed gas-feeding conduit is fitted at the bottom of the reactor, and from this conduit the gas jet discharges to the center point of the circular plate.

10 Claims, 2 Drawing Figures

METHOD FOR DISPERSING GAS IN A SOLID-CONTAINING LIQUID, AND AN APPARATUS FOR IT

BACKGROUND OF THE INVENTION

The present invention relates to a method for directing a desired amount of gas under the liquid surface in a solution reactor, preferably into its bottom part, for dispersing it into small bubbles, for mixing the bubbles as effectively as possible into a suspension of a pulverous solid and a liquid, and for producing in the mixed gas-solid-liquid suspension a strong, suspension-maintaining flow field which is directed downwards in the center of the reactor and upwards along the sides of the reactor. A gas flow directed from below a so-called gls-mixer according to the invention towards its center spreads radially outwards towards the mixer blades. Owing to vertical dispersion blades located at the edges of a circular plate attached on a horizontal plane to the axis, the gas is dispersed into small bubbles under the effect of the strong turbulence field produced by the rotational velocity of the mixer. The small bubbles formed are mixed with a solid-liquid flow in the blade-free area at a point downstream of the said dispersion blades, whereafter the outer, depressing baffles of the gls-mixer produce subsequent dispersion and force the formed suspension towards the lower part of the reactor and from there further upwards along the sides.

The mixer according to the invention is called a gls-mixer, a name which is derived from the operating principle of the mixer: gas is directed under a mixer in which it is dispersed and thereafter mixed with a liquid and a solid.

There are good and practicable methods for mixing a pulverous solid with a liquid to form a good suspension or to disperse a gas in a liquid. These have been described in the literature, for example in Ullmanns Encyklopädie der technischen Chemie, Band 2, pp. 260–281; the references below are to this literature reference.

One example of the mixing of a pulverous solid with a liquid consist of simple so-called pitch-blade mixers having a blade angle of 45° (Ullman, p. 261, Abb 3, g); having a depressing effect, these mixers produce a flow which is downward in the center of the reactor and upward along the sides, and simultaneously produce turbulence important for the reactions.

There are also standard methods for dispersing a gas in a liquid;

A nozzle or several nozzles from which the gas discharges, thereby forming small bubbles.

in a turbine mixer (Ullman, p. 261, Abb. 3, a) having vertical blades, gas directed under the mixer comes within the area of influence of the mixer and is dispersed into smaller bubbles the greater the power used in the turbine.

Gas is also dispersed using so-called self-suction cross-pipes (Ullmann, p. 276, Abb 19), i.e. the gas space branches out from the lower end of a hollow shaft, most commonly into four pipes which are open at their tips. Owing to the underpressure produced in the gas space by the rotating cross-pipe the gas is discharged and dispersed into bubbles in the liquid space in the reactor. It should be noted that, when the temperature of the solution rises, the vapor pressure also rises, whereby the effect of the underpressure decreases.

However, the matter becomes more complicated when it is necessary simultaneously to disperse a gas effectively into small bubbles and, in addition, to maintain a pulverous solid in good suspension in a liquid. None of the methods described above is capable of simultaneously satisfying both these requirements sufficiently well, especially if the solid is coarse-grained and the density of the slurry is high.

The object of the present invention is to direct gas under the surface in a solution reactor, preferably into its lower part, to disperse it into small bubbles, to mix the bubbles as effectively as possible into a suspension of a pulverous solid and a solution, and to produce in the mixed gas-solid-liquid suspension a strong, suspension-maintaining, tubulent flow field which is downward in the center of the reactor and upward along its sides.

SUMMARY OF THE INVENTION

When a three-phase system (pulverous solid-liquid-gas) is in question, performances of different types are required of the gas-dispersing member; dispersing the gas, distributing the formed gas bubbles over the entire cross section of the reactor, bringing the solid particles into motion, and maintaining the suspension thus formed.

It is known that the turbulence of a flow controls the transfer of mass and heat from a bubble and the degree of dispersion of a gas. It is also known that the vortices affecting turbulence are at their largest at their point of formation; in mixers it is close to the tips of the blades, at nozzles in the vicinity of the discharge outlet, etc. At this point their wavelengths or scales are of the same order of magnitude as are those of the main flow. However, large vortices are unstable, and they gradually break down into smaller vortices until, owing to a viscous flow their energy has finally been converted entirely to heat.

The forces regulating the size of a bubble are shear stress and surface tension. Shear stress is dependent on the force of the turbulence, which for its part is dependent, as stated above, on the vicinity of the motion-producing device and, of course, also on its efficiency (velocity, etc.).

It is thus advantageous to produce sufficient turbulence (velocity) as close as possible to the gas-feeding point, as occurs at, for example, a nozzle discharge outlet and even more advantageously in so-called hollow self-suction cross-pipes, in which, in addition to the gas discharge velocity, also the peripheral velocity of the mixer end itself is effective. This same effect of peripheral velocity also appears in radial turbines, in which gas is fed immediately under the blades. In both mixers there is further produced by the rotational motion an area of underpressure behind the blade, enhancing the dispersion of the gas.

In fixed nozzles the dispersion area is primarily point-like. In rotating mixers (radial turbines) it is within the circular area defined by the tip of the blades. In our invention, this dispersion area is somewhat larger than the above, since at a point after the blade-free intermediate space after the first blades, the actual dispersion blades, there are further the outer baffles, which produce a vertical flow and in which the dispersion phenomenon continues.

In the method according to our invention, gas is directed into the reactor mainly from below via a hollow gas-feeding conduit into the lower part of the reactor, to the center point of its cross section. The gas jet leaving the discharge end of the conduit is directed upwards to meet a horizontal circular plate attached above it to a rotating shaft suspended from above. The gas jet, impinging against the center point of the lower side of the said circular plate, spreads below the circular plate radially along its surface towards the vertical dispersion blades, which are parallel to the radius of the circular plate and attached to the edge of the circular plate. The rotating dispersion blades, owing to their velocity, disperse the gas into small bubbles. Thereafter, the formed small gas bubbles discharge into the blade-free mixing space, becoming mixed with a pulverous solid and a liquid to form a good suspension. At a point immediately after the mixing zone, i.e. the area between the dispersion blades and the baffles after them, the suspension formed arrives within the area of influence of these outer baffle and subsequent-dispersion blades. Having a depressing effect, the baffle blades direct the suspension flow towards the lower part of the reactor, at the same time dispersing any bubbles which may have been left large. In the lower part of the reactor the suspension flow turns radially towards the sides of the reactor, further rising upwards along the sides.

It is known that, for example, in a pitch-blade type mixer of the propeller type having a blade angle of 45°, large gas bubbles, when discharging into the blades, weaken the power of the propeller, at which time the propeller begins to rotate in a "gas bubble", and sufficient energy cannot be transferred to the solid particles. As a result, coarse particles in particular descend to the reactor bottom. On the other hand, if the bubbles are small enough, no "rotation in a gas bubble" can occur, and the solid particles receive enough energy and their descending to the bottom is prevented.

It is thus important that, as in our invention, the gas is dispersed sufficiently before it arrives within the area of influence of the baffles and that the subsequent dispersion is carried out only in the baffles themselves, and not vice-versa.

It is, of course, evident that, in addition to the physical phenomena, i.e. dispersion and the formation and maintenance of the suspension, there also occur in the reactor all the time chemical reactions as a result of which the gas and the solid dissolve in the liquid, and thereby a solution suspension is formed in which the solid is partly in suspension, partly in solution.

DESCRIPTION OF THE PREFERRED EMBODIMENTS

Figure 1:
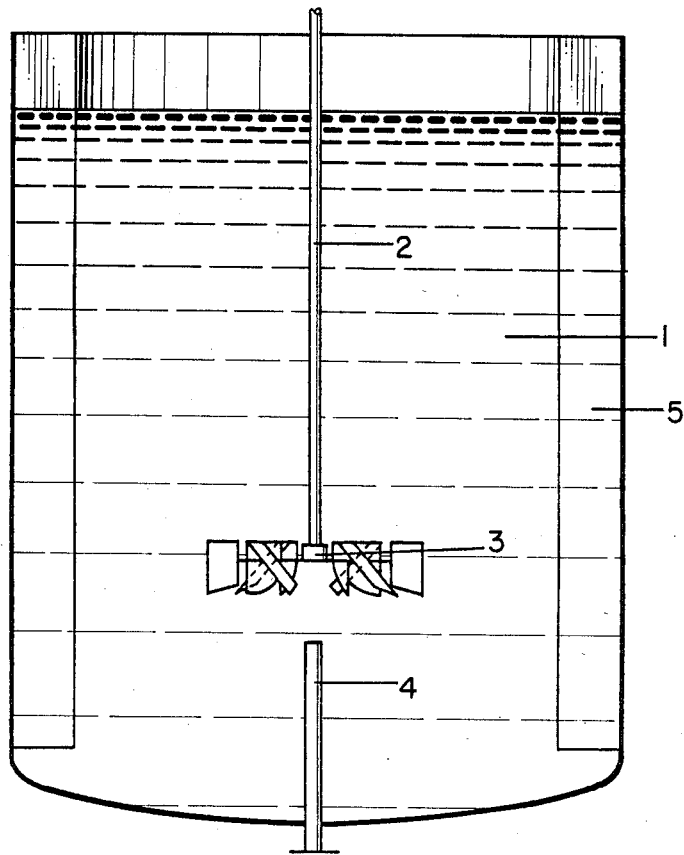
FIG. 1 is a vertical section of a reactor in which a gls-mixer according to the invention has been installed.

FIG. 1 shows a reactor 1. A gls-mixer 3 is attached to a rotating shaft 2 suspended from above. Oriented upwards from the reactor bottom there is a gas-feeding conduit 4, preferably parallel to the shaft 2, and the gas jet discharging from the end of the conduit is directed to discharge to the center point of the cross section of the mixer. The reactor 1 is preferably equipped with baffles 5, which prevent vortex formation.

Figure 2:
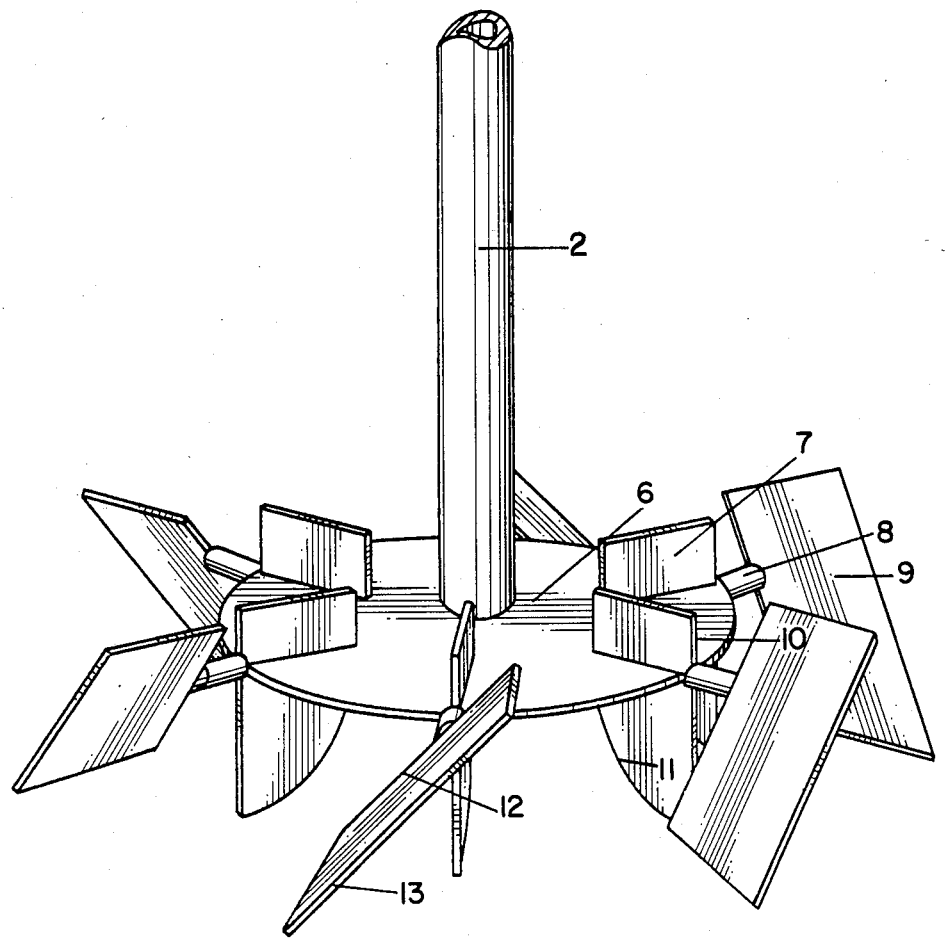
FIG. 2 is a more detailed skew axonometric representation of a gls-mixer.

FIG. 2 depicts in greater detail a gls-mixer according to the invention. The mixer is composed of a horizontal circular plate 6 installed symmetrically at the lower end of a shaft 2, vertical dispersion blades 7 situated at the edges of the circular plate and being parallel to the radius of the circular plate, and of baffle blades 9 at the end of an arm 8 extending from the dispersion blades.

The dispersion blades 7 are located in such a way in relation to the circular plate 6 that the greater part of a blade is below the circular plate 6, a smaller part of it remaining above the plate. Thus, dispersion can occur also above the circular plate. The outer edge 10 of the dispersion blades 7 is vertical. The inner edge 11 may also be straight, but that part of the inner edge 11 of a dispersion blade 7 which is below the circular plate 6 may be suitably rounded in order to reduce energy consumption.

To each dispersion blade 7 there is attached by means of an arm 8 a baffle 9 which is outside the circular plate 6 and at an angle in relation to it. The baffles 9 are attached to the arms 8 in such a way that the greater part of each blade is below the plane formed by the circular plate 6. The shape of the baffles 6 may vary; it may be, for example, a rectangle, a parallelogram, or a trapezoid, as in FIG. 2, in which case that edge 12 which faces the circular plate is shorter than the outer edge 13 of the blade. The angle of the circular plate to the baffles can be varied, but preferably it is 45°.

When the gas jet discharging from the gas-feeding conduit impinges against the circular plate, it spreads from it outwards, in principle radially, but there may be slight deviation from this radial direction owing to the effect of the rotation of the circular plate. The spreading gas jet is dispersed by the dispersion blades into small bubbles within the dispersion zone.

Within the area of the arms which connect the dispersion blades to the baffles there is a mixing zone in which the gas bubbles are mixed with the liquid and the pulverous solid in the liquid. In experiments with the structure of the mixer it has been observed that this blade-free mixing zone is essential for the formation of a good suspension. The extent of the mixing zone depends on the length of the arm which connects the blades to each other. In the studies which have been performed it has been observed that the length of the arm is preferably at minimum ¼ of the width of the baffles, preferably ⅓ of their width.

The purpose of the baffles is, as pointed out previously, to subsequently disperse any larger bubbles possibly present in the suspension and to direct the suspension strongly towards the bottom of the reactor. If the dispersion had not been carried out previously within the dispersion zone and if the gas were still in the form of large bubbles, the baffles would be unable to change the direction of the flow as effectively as in the mixer construction according to the invention. If, on the other hand, the mixer has no baffles, the dispersed gas will not mix as effectively to form a suspension with the liquid and the solid as it does within the mixing zone of a gls-mixer, and it will not be possible to change the direction of the formed suspension strongly towards the bottom and from there further upwards along the sides. By means of the baffles in a gls-mixer it is possible to direct the suspension flow field first downwards, and then upwards along the sides, and thereby to prevent deposit formation on the bottom of the reactor.

The invention is described in greater detail with the aid of the accompanying examples.

EXAMPLE 1

Experiments were performed in a standard reactor (FIG. 1) by varying the mixer according to the invention in order to determine the power required by the 5 different blade types. The mixer used in the experiments was a mixer according to the present invention (FIG. 2), in which that inner edge of the dispersion blades which was below the circular plate was rounded. The mixing blades were trapezoidal in such a way that the inner edge of a blade was shorter than its outer edge, and these blades were at an angle of 45° to the circular plate.

The first measurings (a) were carried out using a mixer according to the invention. During the first stage, the reactor was filled with water (a1). During the second stage, air was fed under the mixer at the center point (a2) of the cross section of the mixer.

The second mixer type (b) was obtained by removing the dispersion blades from the center of the mixer according to the invention. In the third mixer type (c), on the other hand, the outer baffle blades were removed. The same experiments were carried out with these mixers as with the mixer according to the invention: by using only water (b1, c1) and by using, in addition, air feed (b2, c2).

The shaft power P[W] was determined as a function of the rotational velocity $n[s^{-1}]$ by means of measuring of momentum.

Table 1 shows dimensionless power number $\phi$ with Reynolds number $Re \approx 130{,}000$ $$\phi = P/\rho n^3 D^5$$

$$Re = \rho n D^2/\eta$$

where
$\rho$ = water density (kg/m$^3$)
D = mixer diameter (m)
$\eta$ = dynamic viscosity of water (Ns/m$^2$)
n = rotational velocity (s$^{-1}$)

It should be noted that $\phi = f(Re)$ was constant within the Re number range examined.

TABLE 1

| | $\phi$ | |
|---|---|---|
| Mixer type | Experiment 1 air = 0 | Experiment 2 air = 67 m$^3$/hm$^2$ |
| a | 2.3 | 1.3 |
| b | 1.8 | 1.0 |
| c | 8.4 (0.64) | 3.2 (0.24) |

For mixer c there is presented in parenthesis a case in which the D-value D(c)=D(a)=D(b) is used in the calculations. It can be observed from the results that the power required by the mixer (a) according to the invention is equal to the sum of the powers required by mixers (b and c) (cf. expressions in parentheses).

EXAMPLE 2

In order to measure the mixing capacity, experiments were carried out on three different mixer types:

The first mixer used was mixer a according to the invention (Example 1, a). The second type was a 4-blade pitch-blade type, depressing mixer d having a blade angle of 45°. The third one was a 6-blade turbine mixer e having vertical blades. In the experiments, a pulverous solid was added to water in a reactor according to Example 1. The density of the solid was 4200 kg/m$^3$, and its sieve analysis was: 90% < 285 µm, 75% < 240 µm, 50% < 175 µm, 25% < 132 µm. The solid content was adjusted to 50% by weight. The measurings were carried out using both a solid-liquid suspension and by directing air at 6.1 m$^3$/hm$^2$ under the mixer.

The evaluation principle used was the so-called one-second criterion, i.e. the P/V (power/volume) required for the pulverous solid to move within the entire area of the reactor bottom without stopping for a time longer than 1 s was determined. The results are presented in Table 2, in which the measured $\phi$-value is also indicated.

TABLE 2

| | | P/V [kW/m$^3$] | |
|---|---|---|---|
| Mixer type | $\phi$ | Experiment 1 air = 0 | Experiment 2 air = 6.1 [m$^3$/hm$^2$] |
| a | 2.3 | 1.22 | 2.58 |
| b | 1.0 | 1.32 | 4.24 |
| c | 5.1 | 12.84 | 17.13 |

It can be concluded from the results that by means of the mixer according to the invention the solid can be caused to remain in suspension with water and gas at the lowest power requirement per unit volume.

EXAMPLE 3

With the arrangements according to Example 2, the size of an air bubble in water was measured by feeding air at 6.1 m$^3$/hm$^2$ at different P/V values. The results are shown in Table 3.

TABLE 3

| | | Bubble size [mm] | | | |
|---|---|---|---|---|---|
| | | P/V [kW/m$^3$] | | | |
| Mixer type | $\phi$ | 1 | 2 | 3 | 5 |
| a | 2.3 | 5 | 3 | 2 | 1 |
| d | 1.0 | 7 | 6 | 6 | 5 |
| e | 5.1 | 7 | 4.5 | 3 | 2 |

The results show that the smallest bubble size is obtained using the mixer according to the invention, the power used per reactor volume being the same.

EXAMPLE 4

A gls-mixer and a depressing, straight-blade pitch-blade type mixer were compared with each other in experiments in which a silicate which contained disseminated sulfide was leached in water. A degree of grinding of 93%–200 mesh, a slurry density of 50%, and a temperature of 60° C. were used. The analysis of the solid selected for the experiments was, as regards the metals, Fe 8.7%, Ni 0.35% and Cu 0.14%.

The slurry amount was 2300 ml and the height of the slurry column the same as the diameter of the cylindrical leaching reactor. The reactor was equipped with four vertical baffles, the width of which in the radial direction was 1/10 of the reactor diameter. The straight baffles were installed at an even pitch on the reactor circumference.

The diameter of the mixer was in each mixer ⅓ of the reactor diameter, and the mixers were installed at a distance of the mixer diameter from the reactor bottom.

35 m$^3$/hm$^2$ air in proportion to the reactor bottom surface was fed into the reactor, and the air was directed under the mixer, to its immediate vicinity, vertically upwards. In a series of leaching experiments, either a gls-type or a straight-blade pitch-blade type mixer was used. In both mixers, the number of revolutions was adjusted in separate experiments so that the shaft power of the mixer per effective reactor volume was either 3 kW/m$^3$ or 5 kW/m$^3$. The leaching results are shown in the following table. It should be mentioned that the faster the copper and nickel level of the solution increases or the more sharply its iron level decreases, the more effective is the mixer used.

| | Mixer shaft power per effective reactor volume | | | | | | | | | | | |
|---|---|---|---|---|---|---|---|---|---|---|---|---|
| | 3 kW/m$^3$ | | | | | | 5 kW/m$^3$ | | | | | |
| Leaching | gls-mixer | | | straight-blade pitch-blade mixer | | | gls-mixer | | | straight-blade pitch-blade mixer | | |
| time h | Cu | Ni | Fe | Cu | Ni | Fe | Cu mg/l | Ni | Fe | Cu | Ni | Fe |
| 5 | <5 | 26 | 150 | <5 | 32 | 130 | <5 | 56 | 240 | <5 | 47 | 133 |
| 15 | <5 | 1000 | 3200 | <5 | 710 | 2000 | <5 | 1100 | 3000 | <5 | 600 | 1480 |
| 29 | 33 | 1500 | 3200 | 9 | 1150 | 2250 | 41 | 1900 | 2100 | <5 | 1150 | 1550 |
| 44 | 72 | 1910 | 1050 | 40 | 1530 | 1200 | 68 | 2000 | 900 | 23 | 1700 | 750 |
| 59 | | | | | | | 85 | 2100 | 490 | 44 | 2000 | 400 |
| 74 | | | | | | | 94 | 2300 | 315 | 56 | 2300 | 300 |

What is claimed is:

1. A method for dispersing gas into small bubbles in a liquid in order to form a suspension of a gas, a liquid and a pulverous solid in the liquid and to produce a strong, suspension-maintaining flow field in a reaction chamber, comprising: introducing the gas into the bottom of a vessel, at the center, and directing the gas below the surface of a liquid which contains a pulverous solid towards the center of a horizontal, rotary, imperforate circular plate symmetrically positioned at the lower end of a rotating shaft which is suspended by its upper end, said circular plate being provided with vertical dispersing means attached to the edge of the circular plate, said vertical dispersing means being vertical dispersion blades parallel to the radius of the circular plate and located on the edges of the circular plate, whereby the gas spreads radially outwardly to form small bubbles, and a suspension of gas, liquid and solid is formed, said circular plate having attached arms and downwardly directed guiding means connected to said arms, said guiding means being baffle blades located outside the circular plate periphery and attached to the dispersion blades by arms on the plane of the circular plate, said gas being introduced by means of a gas-feeding conduit directed upwards from the reactor chamber bottom to below the circular plate at the center point of its cross-section, whereby the gas bubbles are further dispersed and said suspension is caused to change the direction of flow downwardly towards the bottom of the reaction chamber and then the direction of flow is again directed upwardly along the sides of the reaction chamber.

2. A mixer for dispersing gas into small bubbles in a liquid in order to form a suspension of gas, a liquid and pulverous solid in the liquid and to produce a strong, suspension-maintaining flow field in a reaction chamber, the mixer being located symmetrically in the lower part of the reactor and being situated at the end of a rotating shaft suspended by its upper end, above a gas-feeding conduit, comprising: at the lower end of the shaft a horizontal imperforate circular plate, symmetrical in relation to the shaft; vertical dispersion blades, parallel to the radius of the circular plate being situated on the edges of the circular plate; baffle blades outside the circular plate attached to the dispersion blades by means of arms on the plane of the circular plate; and the gas-feeding conduit situated upwards from the reactor bottom being directed to below the circular plate, to the center point of its cross section.

3. A mixer according to claim 2, in which the dispersion blades are situated in such a way in relation to the circular plate that they are in part above the circular plate, in part below it, the substantially greater part of each being below the circular plate.

4. A mixer according to claim 2, in which the outer and the inner edges of the dispersion blades are vertical.

5. A mixer according to claim 2, in which that part of the inner edge of the dispersion blades which is below the circular plate is rounded.

6. A mixer according to claim 2, in which the baffles are at an angle to the circular plate.

7. A mixer according to claim 2, in which the baffles are at an angle of 45° to the circular plate.

8. A mixer according to claim 2, in which the greater part of the baffles is below the plane of the circular plate.

9. A mixer according to claim 2, in which that edge of a baffle facing the circular plate is shorter than its outer edge.

10. A mixer according to claim 2, in which the length of the arms between the dispersion blades and the baffles is at minimum ¼ of the width of the baffle.

* * * * *